United States Patent [19]

Lander

[11] Patent Number: 5,160,951
[45] Date of Patent: Nov. 3, 1992

[54] REAR VIEW PROJECTION SYSTEM

[76] Inventor: Stephen Lander, 192 Wood St., Rutherford, N.J. 07070

[21] Appl. No.: 780,138

[22] Filed: Oct. 21, 1991

[51] Int. Cl.⁵ .............................................. G03B 21/58
[52] U.S. Cl. ....................................... 353/79; 353/75; 353/119; 359/443
[58] Field of Search ....................... 353/74, 75, 79, 72, 353/97, 119; 359/460, 443; 358/60, 231, 254, 255, 237; 312/19, 29, 30, 22

[56] References Cited

U.S. PATENT DOCUMENTS

| | | | |
|---|---|---|---|
| 1,643,134 | 9/1927 | Serrurier | 353/72 |
| 1,746,607 | 2/1930 | Readeker | 353/79 |
| 4,090,754 | 5/1978 | Kavis | 353/79 |
| 4,139,283 | 2/1979 | Cook | 359/460 |
| 4,351,592 | 9/1982 | Link et al. | 353/72 |
| 4,506,295 | 3/1985 | Young | 358/231 |
| 4,556,283 | 12/1985 | Numata et al. | 353/72 |
| 4,647,166 | 3/1987 | Franken | 353/79 |
| 4,705,355 | 11/1987 | Espo | 359/443 |

*Primary Examiner*—William A. Cuchlinski, Jr.
*Assistant Examiner*—William C. Dowling

[57] ABSTRACT

A rear view projection apparatus for viewing from a rear screen side the images projected onto the screen front side. This apparatus comprises a projector, a screen made of a transparent plastic material, a base having a recess for the screen, a projector support cantilevered from the base, and a retractable screen support having an extender scissors unit for raising the screen for use or for lowering the screen into the recess for storage.

6 Claims, 2 Drawing Sheets

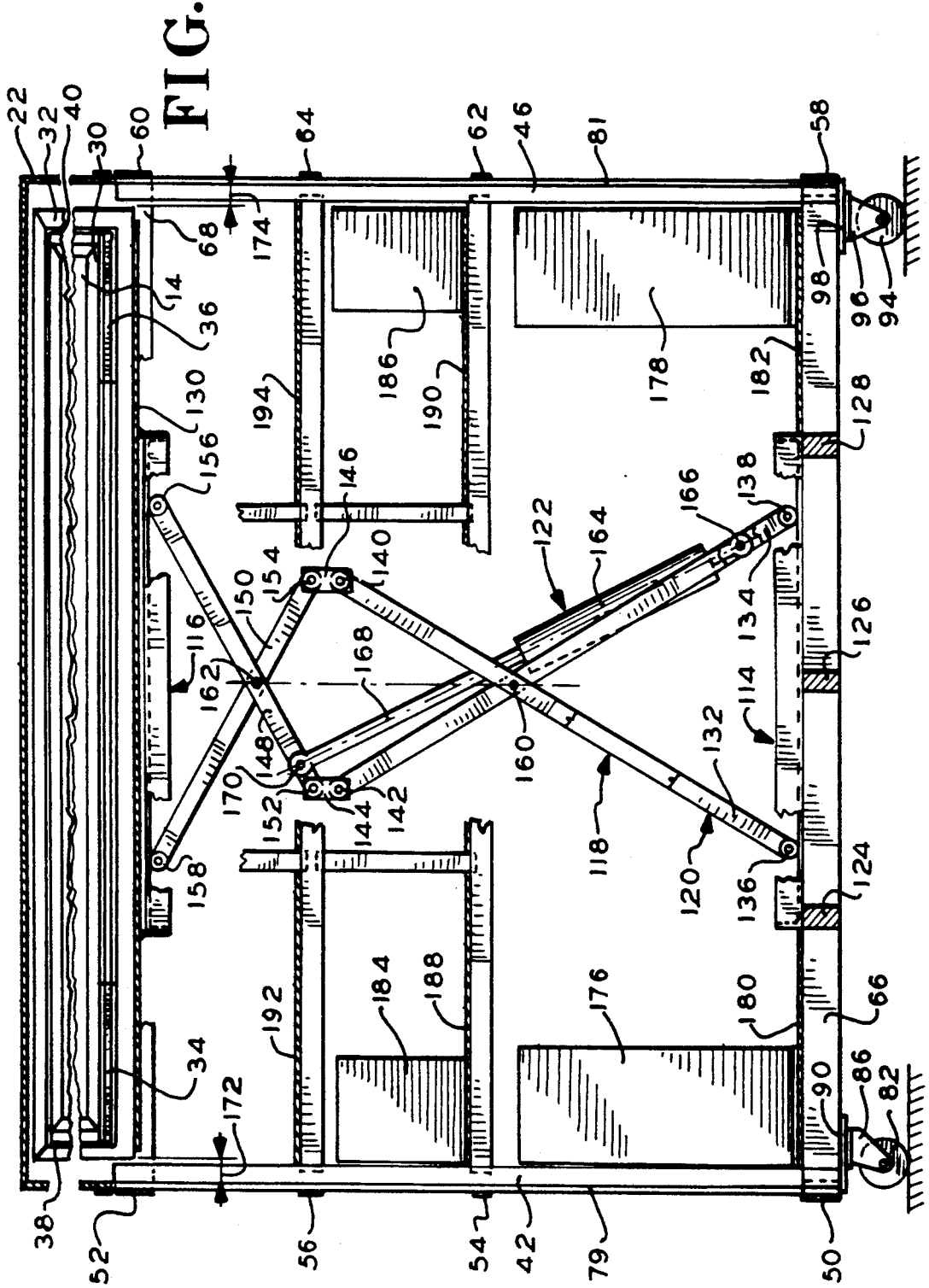

REAR VIEW PROJECTION SYSTEM

The invention relates to a rear view projection system, and in particular, the invention relates to a rear view projection assembly or system having a base structure with a retractable screen support an a foldable projector support.

BACKGROUND OF THE INVENTION

The prior art rear view projection assembly is described in U.S. Pat. No. 1,385,955 issued Jul. 26, 1921. Related patents include U.S. Pat. No. 1,643,134 issued Sep. 20, 1927; U.S. Pat. No. 3,040,622 issued Jun. 26, 1962, and German patent Number 734 672 dated May 4, 1943.

The prior art rear view projection assembly includes a projector, a screen, and a base structure having a top wall supporting the projector and having a sidewall with a foldable bracket supporting the screen.

One problem with the prior art rear view projection assembly is that the foldable bracket for the screen is sometimes difficult to operate.

SUMMARY OF THE INVENTION

According to the present invention, a rear view projection assembly is provided. This assembly comprises a projector, a screen, a base structure having a top portion with a vertical recess, a retractable screen support and actuator received in the recess for raising and lowering the screen, and a foldable projector support mounted on a side portion of the base structure. By using the retractable screen support and actuator, the difficulty of operating the screen support is avoided.

The foregoing and other objects, features and advantages will be apparent from the following description of the preferred embodiment of the invention as illustrated in the accompanying drawings.

BRIEF DESCRIPTION OF THE DRAWINGS

FIG. 2 is a section view as taken along the line 22 of FIG. 1.

DESCRIPTION OF THE PREFERRED EMBODIMENT

Figure 1:
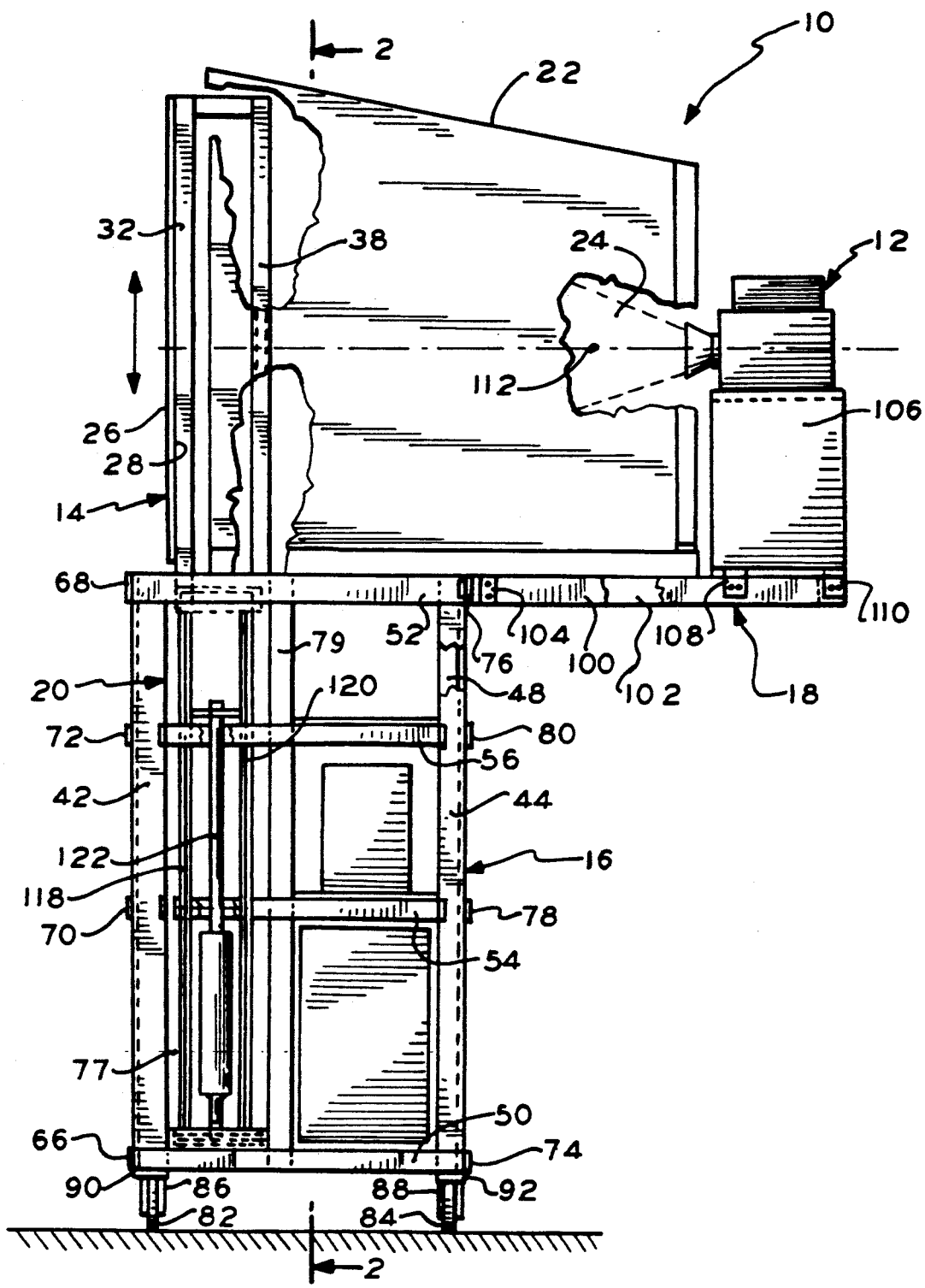
FIG. 1 is an elevator view of a rear view projection assembly according to the present invention.

As shown in FIGS. 1 and 2, a rear view projection system or assembly 10 is provided. Assembly 10 includes a projector 12, a screen 14 a base or lower structure 16 which supports projector 12 and screen 14, and a projector support 18 which is mounted on base 16. Assembly 10 also includes a screen support 20 which is mounted on base 16, and a hood 22. Projector 12 has a light beam 24 which is covered by hood 22.

Screen 14, which is made of a transparent plastic material, has a front face 26 which is viewed and has a rear face 28 which receives beam 24. Screen 14 also has a four-sided inner frame 30 which supports screen 14, and has a four-sided outer frame 32 which supports inner frame 30, and has bent plates or clips 34,36 which support outer frame 32. Outer frame 32 has near and far braces 38,40.

Base 16, which is a welded structure, has near side legs 42,44 and far side legs 46,48. Base 16 also has near side bottom and top bars 50,52 and intermediate bars 54,56. Base 16 also has far side bottom and top bars 58,60 and intermediate bars 62,64. Base 16 also has left side bottom and top bars 66,68 and intermediate bars 70,72. Base 16 also has right side bottom and top bars 74,76 and intermediate bars 78,80. Such bottom and top bars and intermediate bars can have a covering made of wood or sheet steel or the like if desired. Base 16 also has near side vertical bar 79 and far side vertical bar 81. A vertical recess 77 is formed alongside bars 66,68,70,72 which receives screen support 20.

Base 16 has near side wheels 82,84 which have respective brackets 86,88 that are bolted to base plates 90,92. Base 16 also has far side left wheel 94 and bracket 96 and base plate 98. Far side right wheel and its bracket and base plate are not shown.

Projector support 18 has two cantilever folding angles 100,102. Angle 100, which is like angle 102, has a hinge 104 which is fused to right side top bar 76. Support 18 also has a riser block 106, which is supported by angles 100,102, and on which projector 12 rests. Riser block 106 has adjustable connectors 108,110 for adjusting the height and tilt of projector 12. Riser block has identical connectors (not shown) on the far side thereof. Projector 12 has an axis 112.

In operation, angles 100,102 extend or cantilever outwardly to support projector 12 and riser block 106. Angle 100,102 are later folded inwardly after removing projector 12 and rear block 106 for storage.

As shown in FIG. 2, screen support has a bottom horizontal platform 114, which is a plate with upturned edges, and has a top horizontal platform 116, which is a plate with downturned edges. Screen support 20 also has a left side extender or scissors subassembly 118 and a right side scissors subassembly 120 and an actuator 122. Bottom platform 114 is supported by three cross beams 124,126,128, which are supported by bars 66 and 74. Top platform 116 has an elongate base plate 130, which supports outer frame 32 and braces 38,40.

Right side scissors subassembly 120 is identical to left side scissors subassembly 119. Subassembly 120 has scissors bars 132,134, which have respective rollers 136,138 and which have respective top pins 140,142. Subassembly 120 also has short middle bars 144,146 and has upper bars 148, 150 which have respective bottom pins 152,154 and top rollers 156,158. Lower scissor bars 132,134 have a center pin 160, upper scissor bars 148,150 have a center pin 162.

Actuator 122 has a cylinder 164 which has a cross rod 166 that is connected to right side bar 134 and the corresponding left side bar (not shown). Actuator 122 also has a piston 168 which has a cross rod 170 that is connected to bar 148 and its corresponding left side bar (not shown).

In operation, cylinder 164 is actuated by a fluid motor (not shown). Cylinder 164 actuates piston 166 which actuates scissor bars 132,143,148,150, to raise or lower top platform 116, outer frame 32, inner frame 30 and screen 14. Outer frame 32 has end clearances 172,174. In the up or raised position of screen 14, light beam 24 from projector 12 impacts onto rear surface 28 for view an image on front surface 26. Rollers 136,158 are free to roll. Rollers 138,156 may be fixed to respective platforms 114,116. Near and far sound units 176,178 are placed on respective shelf plates 180,182. Near and far projector boxes 184,186 are placed for storage on middle shelf plates 188,190. Upper shelf plates 192,194 are also provided in order to store riser block 106 and film packages and other like parts.

Advantages of assembly 10 are indicated hereafter.

A) By using recess 77 and screen support 20, the difficulty of setting up the screen is avoided.

B) By using recess 77 and screen support 20, the difficulty of operating the screen support is avoided.

C) By using hood 22, glare from assembly 10 is minimized.

While the invention has been described in its preferred embodiment, it is to be understood that the words which have been used are words of description rather than limitation and that changes may be made within the purview of the appended claims without departing from the true scope and spirit of the invention in its broader aspects.

What is claimed is:

1. A rear view projection apparatus comprising:
   a projector of a light beam to form images;
   a screen made of a transparent material;
   a base supporting the projector and having a recess for the screen;
   a projector support which is mounted on the base;
   a retractable screen support received in the recess;
   said screen having a first face for reviewing the images and having a second face for receiving the images; and
   said screen support having a top platform supporting the screen and having an extender scissor unit for extending and retracting the top platform and having a bottom platform supporting the extender scissor unit end being supported by the base.

2. The apparatus of claim 1, wherein the extender scissor unit includes a pair of extender scissor subassemblies and a fluid actuator for vertical extension and retraction thereof.

3. The apparatus of claim 1, wherein the projector has a hood for minimizing glare therefrom.

4. The apparatus of claim 1 wherein the top platform has a base plate mounted thereon and having a support frame mounted on the base plate for supporting the screen.

5. The apparatus of claim 1, wherein the base includes four angle corner legs and a plurality of horizontally disposed vertically spaced bars fixedly connected to the legs forming four sides of the base.

6. The apparatus of claim 1, wherein the projector support includes a pair of cantilevered angles each having a hinge connection to the base for folding in the angles when not in use.

* * * * *